United States Patent
Kawanishi (10) Patent No.: US 9,490,861 B2
(45) Date of Patent: Nov. 8, 2016

(54) ELECTRONIC APPARATUS WITH PARTIALLY-COVERED POLYGONAL-SHAPED SAPPHIRE DISPLAY COVER

(71) Applicant: KYOCERA Corporation, Kyoto-shi, Kyoto (JP)

(72) Inventor: Hiroyoshi Kawanishi, Sanda (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/869,199

(22) Filed: Sep. 29, 2015

(65) Prior Publication Data

US 2016/0020811 A1  Jan. 21, 2016

Related U.S. Application Data

(63) Continuation of application No. 14/612,119, filed on Feb. 2, 2015, now Pat. No. 9,176,534, which is a continuation of application No. PCT/JP2014/078557, filed on Oct. 28, 2014.

(30) Foreign Application Priority Data

Oct. 29, 2013 (JP) ................. 2013-224004

(51) Int. Cl.
*H04M 1/02* (2006.01)
*H04B 1/3888* (2015.01)
(Continued)

(52) U.S. Cl.
CPC ........... *H04B 1/3888* (2013.01); *G06F 1/1626* (2013.01); *G06F 1/1637* (2013.01);
(Continued)

(58) Field of Classification Search
CPC .................... H04M 1/72519; H04M 1/72583; H04M 1/72522; H04M 1/72547; H04M 1/0214; G06F 1/1616; G06F 1/1656; G06F 1/1632; G06F 1/1679; G06F 1/1635; G06F 1/1626; G06F 2200/1632; G06F 2200/1633
See application file for complete search history.

(56) References Cited

U.S. PATENT DOCUMENTS

| | | | | |
|---|---|---|---|---|
| 4,352,961 A | * | 10/1982 | Kumada | ............ H04R 17/10 310/321 |
| 7,027,359 B2 | * | 4/2006 | Apotheloz | ............ G04R 60/10 235/487 |

(Continued)

FOREIGN PATENT DOCUMENTS

| | | |
|---|---|---|
| JP | 09-008690 A | 1/1997 |
| JP | 2004-517499 A | 6/2004 |

(Continued)

OTHER PUBLICATIONS

International Search Report and Written Opinion of the International Searching authority issued by the Japanese Patent Office for International Application No. PCT/JP2014/078557.

(Continued)

*Primary Examiner* — Xanthia C Cunningham
(74) *Attorney, Agent, or Firm* — Procopio Cory Hargreaves and Savitch LLP (57) ABSTRACT

An electronic apparatus comprises a display unit and a first cover member that is located on a surface of the electronic apparatus and includes a layer made of sapphire. The first cover member has a first surface opposed to a display surface of the display unit and a second surface opposite to the first surface. The electronic apparatus includes an apparatus case to which the first cover member is mounted and accommodates the display unit. The second surface of the first cover member comprises an outline including first through sixth partial outlines. The electronic apparatus includes a second cover member and a fixing member that fixes said second cover member and said apparatus case to each other.

6 Claims, 9 Drawing Sheets

(51) Int. Cl.
  *G06F 1/16* (2006.01)
  *A45C 11/00* (2006.01)
(52) U.S. Cl.
  CPC ........... *G06F1/1656* (2013.01); *G06F 1/1688* (2013.01); *H04M 1/0266* (2013.01); *A45C 2011/002* (2013.01); *G06F 2200/1633* (2013.01)

(56) References Cited

U.S. PATENT DOCUMENTS

| | | | | |
|---|---|---|---|---|
| 7,106,392 | B2* | 9/2006 | You | G06F 1/1637 |
| | | | | 349/56 |
| 7,304,837 | B2* | 12/2007 | Lo | G06F 1/1601 |
| | | | | 248/313 |
| 7,320,523 | B2* | 1/2008 | Ohkubo | G03B 21/18 |
| | | | | 348/748 |
| 7,385,874 | B2* | 6/2008 | Vuilleumier | H01Q 1/273 |
| | | | | 343/718 |
| 8,014,142 | B2* | 9/2011 | Prest | H05K 5/0017 |
| | | | | 349/56 |
| 2004/0092283 | A1 | 5/2004 | Hutchison et al. | |
| 2004/0114318 | A1 | 6/2004 | Nuovo et al. | |
| 2005/0048804 | A1* | 3/2005 | Henriet | H01Q 1/273 |
| | | | | 439/37 |
| 2010/0142127 | A1* | 6/2010 | Johansson | H04M 1/026 |
| | | | | 361/679.01 |
| 2010/0226105 | A1* | 9/2010 | Zhou | H05K 1/182 |
| | | | | 361/752 |
| 2012/0212890 | A1* | 8/2012 | Hoshino | H04M 1/0202 |
| | | | | 361/679.01 |
| 2012/0270016 | A1 | 10/2012 | Hashimoto et al. | |
| 2012/0327327 | A1* | 12/2012 | Joo | H05K 1/189 |
| | | | | 349/58 |
| 2014/0139771 | A1* | 5/2014 | Choi | G09G 3/20 |
| | | | | 349/43 |

FOREIGN PATENT DOCUMENTS

| | | |
|---|---|---|
| JP | 2013-063889 A | 4/2013 |
| JP | 2013-098650 A | 5/2013 |
| JP | 2013-131987 A | 7/2013 |
| WO | 2012/114763 A1 | 8/2012 |

OTHER PUBLICATIONS

Office Action dated Nov. 10, 2015, issued in counterpart Japanese Application No. 2014-258478.

* cited by examiner

ELECTRONIC APPARATUS WITH PARTIALLY-COVERED POLYGONAL-SHAPED SAPPHIRE DISPLAY COVER

CROSS-REFERENCE TO RELATED APPLICATION

The present application is a continuation of U.S. application Ser. No. 14/612,119 filed on Feb. 2, 2015, which is a bypass continuation application of PCT Application No. PCT/JP2014/078557, filed on Oct. 28, 2014, which claims the benefit of Japanese Application No. 2013-224004, filed on Oct. 29, 2013. The contents of the above applications are each incorporated by reference herein in their entirety.

FIELD

Embodiments of the present disclosure relate to an electronic apparatus.

BACKGROUND ART

Various technologies have conventionally been proposed for electronic apparatuses.

SUMMARY

An electronic apparatus is disclosed. In one embodiment, an electronic apparatus comprises a display unit, a first cover member, an apparatus case, a second cover member, and a fixing member. The first cover member is located on a surface of the electronic apparatus, includes a layer made of sapphire, and has a first surface opposed to a display surface of the display unit and a second surface opposite to the first surface. The apparatus case, to which the first cover member is mounted, is configured to accommodate the display unit. The second surface of the first cover member has an outline including first and second partial outlines that extend along a first direction and are parallel to each other, third and fourth partial outlines that extend along a second direction perpendicular to the first direction and are parallel to each other, a fifth partial outline connecting one end of the first partial outline and one end of the third partial outline, and a sixth partial outline connecting the other end of the first partial outline and one end of the fourth partial outline. The second cover member is configured to cover the first partial outline, the fifth partial outline, and the sixth partial outline. The fixing member is configured to fix the second cover member and the apparatus case to each other. In a plan view seen from the second surface side, the fixing member is located in an area enclosed by a first phantom line extending along the first direction from the one end of the first partial outline, a second phantom line extending along the second direction from the one end of the third partial outline, and the fifth partial outline.

DESCRIPTION OF EMBODIMENT

Figure 1:
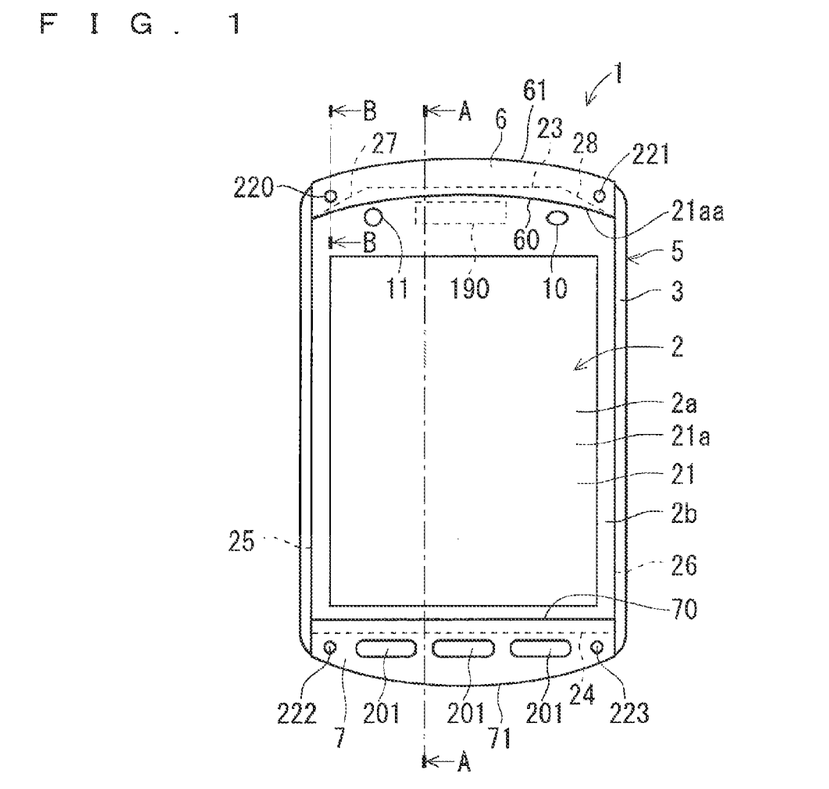
FIG. 1 illustrates a front view showing an external appearance of an electronic apparatus.
Figure 2:
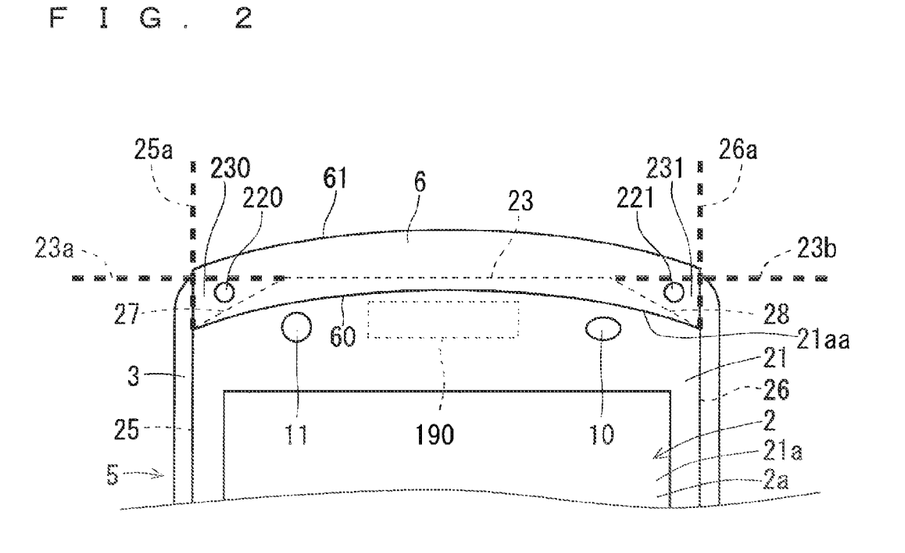
FIG. 2 illustrates a front view showing the electronic apparatus partially enlarged.
Figure 3:
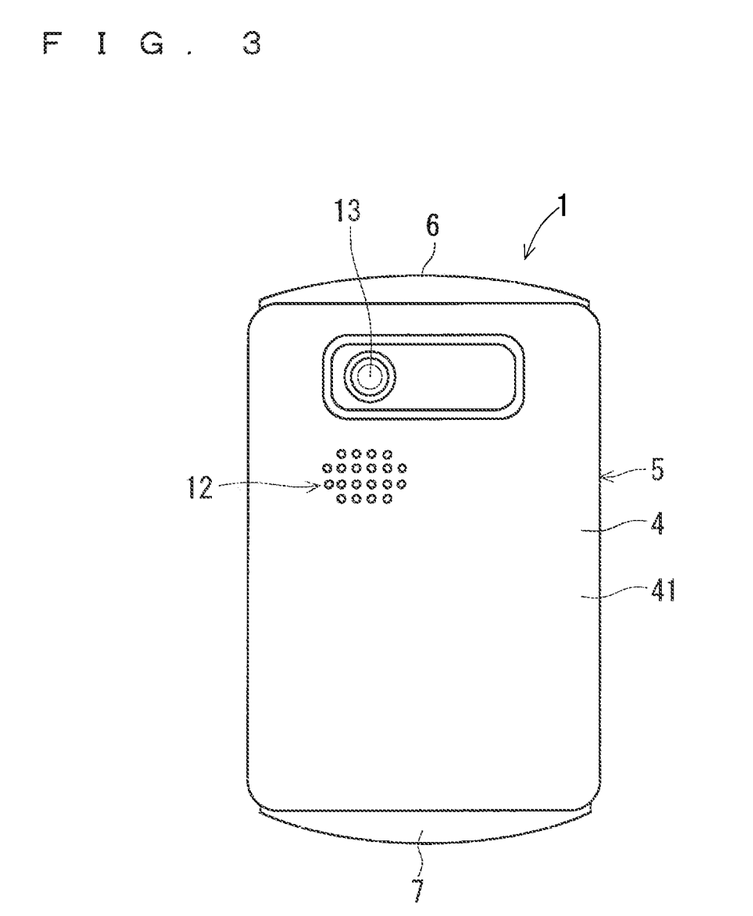
FIG. 3 illustrates a rear view showing an external appearance of the electronic apparatus.
Figure 4:
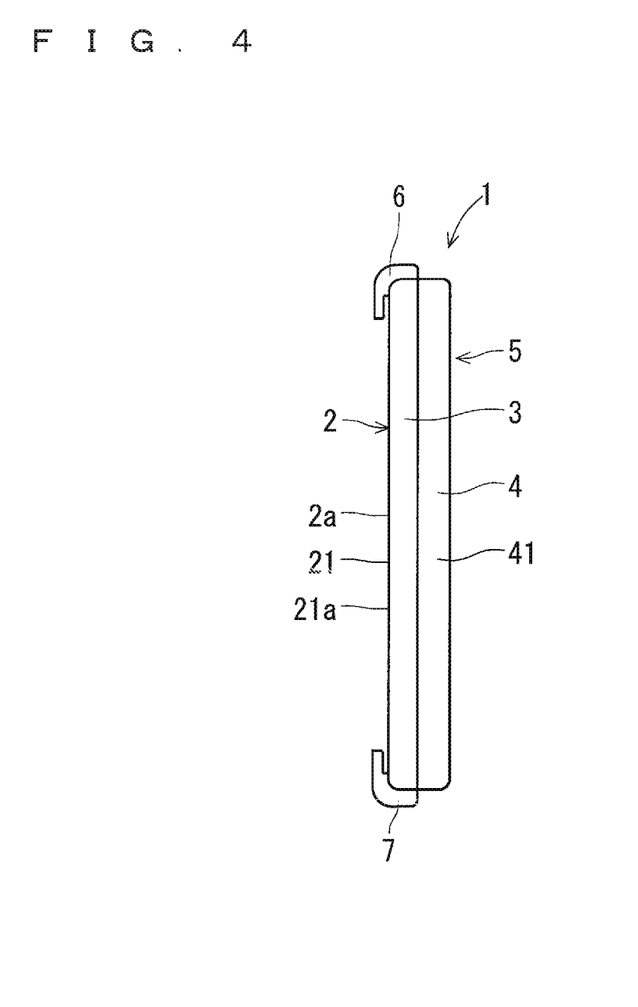
FIG. 4 illustrates a side view showing the external appearance of the electronic apparatus.
Figure 5:
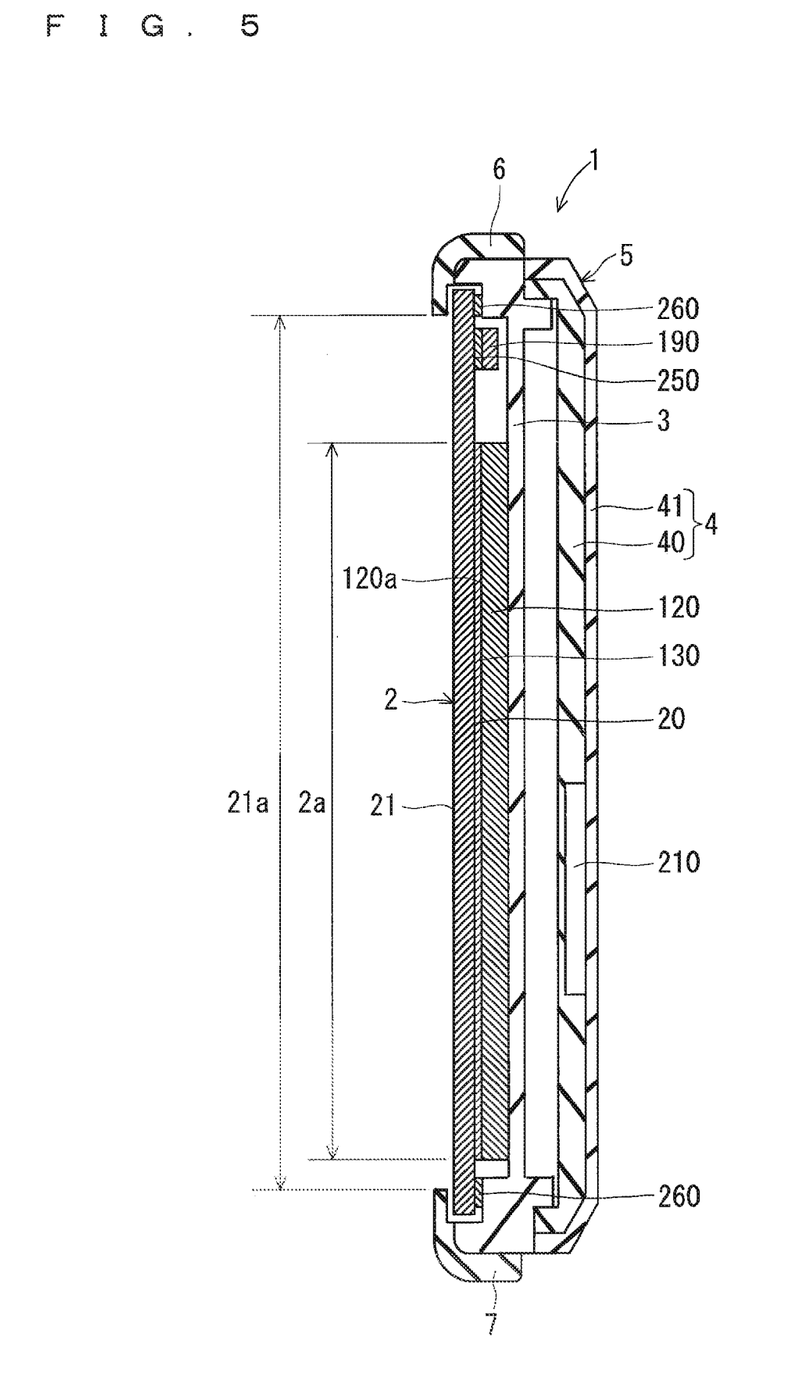
FIG. 5 illustrates a sectional structure of the electronic apparatus.
Figure 6:
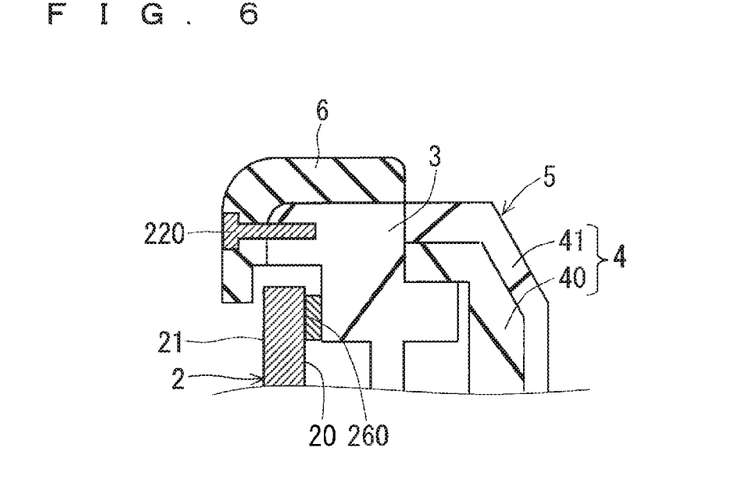
FIG. 6 illustrates the sectional structure of the electronic apparatus.
Figure 7:
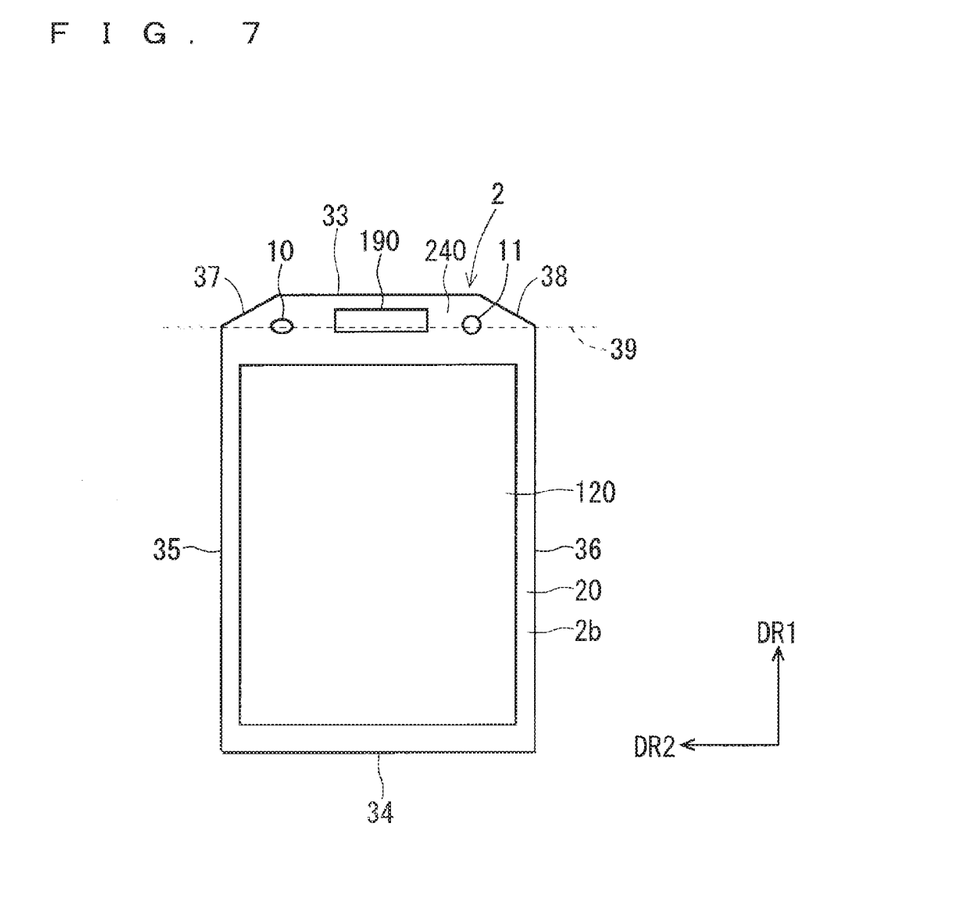
FIG. 7 illustrates a plan view showing a display-surface cover member when seen from its inner surface side.
Figure 8:
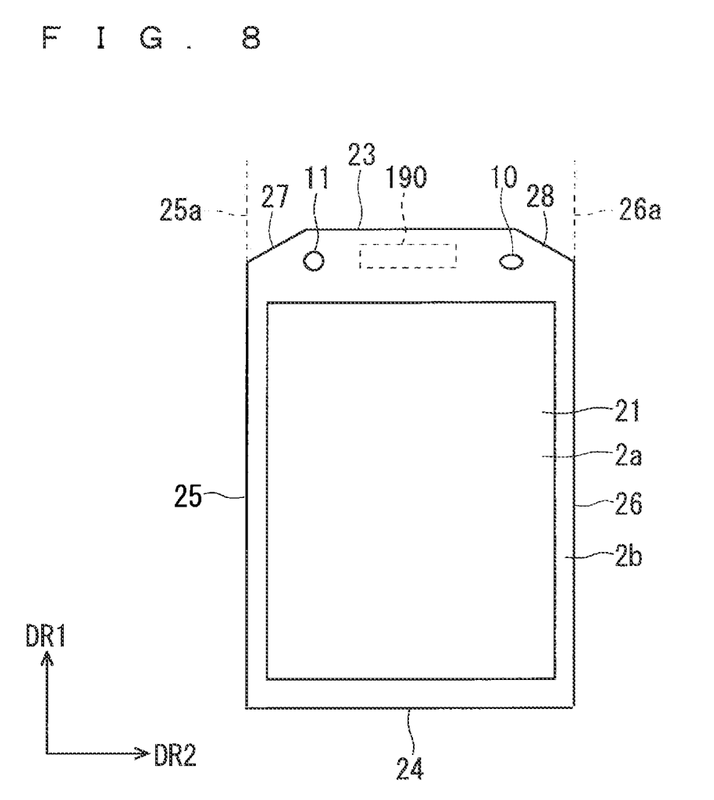
FIG. 8 illustrates a plan view showing the display-surface cover member when seen from its outer surface side.
Figure 9:
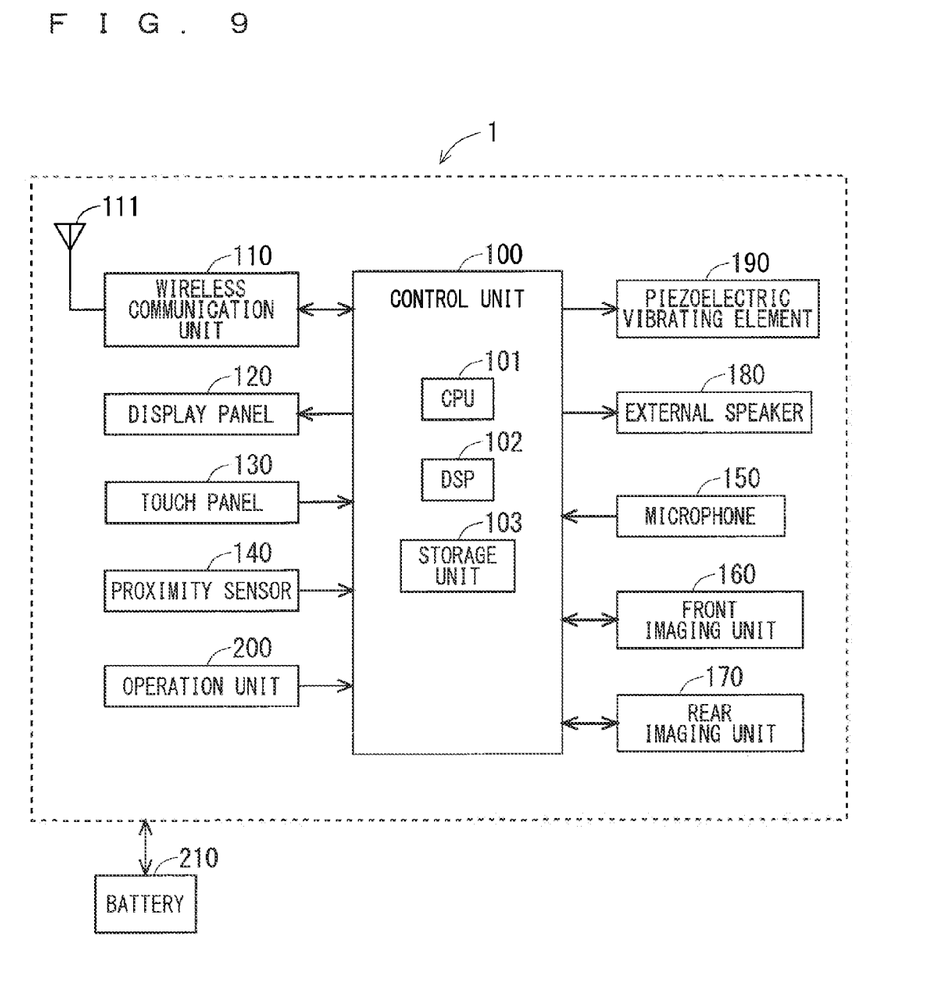
FIG. 9 illustrates an electrical configuration of the electronic apparatus.

FIG. 1 is a front view showing the external appearance of an electronic apparatus 1 according to one embodiment. FIG. 2 illustrates the electronic apparatus 1, which is illustrated in FIG. 1, partially enlarged. FIGS. 3 and 4 are a rear view and a right side view, respectively, showing the external appearance of the electronic apparatus 1. FIG. 5 illustrates the enlarged sectional structure of the electronic apparatus 1 illustrated in FIG. 1, which is taken along the line A-A. FIG. 6 illustrates the enlarged sectional structure of the electronic apparatus 1 illustrated in FIG. 1, which is taken along the line B-B. FIGS. 7 and 8 are a rear view and a front view, respectively, of a display-surface cover member 2 of the electronic apparatus 1. The display-surface cover member 2 illustrated in FIG. 7 is provided with a piezoelectric vibrating element 190 and a display panel 120 of the electronic apparatus 1. FIG. 9 is a block diagram illustrating the electrical configuration of the electronic apparatus 1.

The electronic apparatus 1 according to one embodiment is, for example, a mobile phone such as a smartphone. Hereinafter, the electronic apparatus 1 according to one embodiment will be described in detail with reference to FIGS. 1 to 9. The electrical configuration of the electronic apparatus 1 will be described first, and then, the mechanical configuration of the electronic apparatus 1 will be described.

<Electrical Configuration of Electronic Apparatus>

As illustrated in FIG. 9, the electronic apparatus 1 includes a control unit 100, a wireless communication unit 110, a display panel 120, a touch panel 130, a proximity sensor 140, and a microphone 150. The electronic apparatus 1 further includes a front imaging unit 160, a rear imaging unit 170, an external speaker 180, a piezoelectric vibrating element 190, an operation unit 200, and a battery 210. These elements are provided in an apparatus case 5 of the electronic apparatus 1, which will be described below.

The control unit 100 includes a Central Processing Unit (CPU) 101, a Digital Signal Processor (DSP) 102, and a storage unit 103. The control unit 100 can manage the overall operation of the electronic apparatus 1 by controlling other elements of the electronic apparatus 1.

The storage unit 103 is a recording medium which is non-transitory and is readable by the control unit 100 (CPU 101 and DSP 102) such as a Read Only Memory (ROM) and a Random Access Memory (RAM). A main program, a plurality of application programs, and the like stored in the storage unit 103. The main program is a control program for controlling the electronic apparatus 1, specifically, for controlling respective elements such as the wireless communication unit 110, the display panel 120, and the like of the electronic apparatus 1. Various functions of the control unit 100 can be enabled by the CPU 101 and the DSP 102 executing various programs in the storage unit 103.

Further, in addition to the ROM and the RAM, the storage unit 103 may include a non-transitory recording medium, which is readable by a computer. The storage unit 103 may include, for example, a compact hard disk drive and a Solid State Drive (SSD).

The wireless communication unit 110 includes an antenna 111. In the wireless communication unit 110, the antenna 111 can receive a signal from a mobile phone different from the electronic apparatus 1, or from a communication device such as a web server connected to the Internet via a base station. The wireless communication unit 110 can perform an amplification process and down conversion on the received signal and output the signal to the control unit 100. The control unit 100 can perform demodulation processing or the like on the input signal, and acquire a sound signal (sound information) indicating a voice or music included in the received signal.

Further, the wireless communication unit 110 can perform up-converting and the amplification process on a transmission signal including a sound signal or the like generated in the control unit 100, and wirelessly transmit the transmission signal after the process from the antenna 111. The transmission signal from the antenna 111 can be received in a communication device connected to the Internet or a mobile phone different from the electronic apparatus 1 via the base station.

The display panel 120 being a display unit is, for example, a liquid crystal display panel or an organic electro luminescent (EL) panel. The display panel 120 can display various pieces of information such as characters, symbols, and figures by control of the control unit 100. The information displayed in the display panel 120 can be visually recognized by the user of the electronic apparatus 1 through a display portion 2a of the display-surface cover member 2 (see, for example, FIGS. 1 and 5).

The touch panel 130 is, for example, a projection type electrostatic capacitance touch panel. The touch panel 130 can detect contact of an object with respect to the display portion 2a of the display-surface cover member 2, and output a detection signal according to the detected contact. The touch panel 130 is attached to an inner surface 20 of the display-surface cover member 2, as described below (see, for example, FIG. 5). The touch panel 130 includes two sheet-shaped electrode sensors opposed to each other. The two electrode sensors are bonded to each other through a transparent adhesive sheet.

Formed in one of the electrode sensors are a plurality of long and narrow X electrodes that extend along an X-axis direction (for example, the horizontal direction of the electronic apparatus 1) and are disposed parallel to one another. Formed on the other electrode sensor are a plurality of long and narrow Y electrodes that extend along a Y-axis direction (for example, vertical direction of the electronic apparatus 1) and are disposed parallel to one another. When the finger or the like of the user contacts the display portion 2a of the display-surface cover member 2, the capacitance between the X electrode and Y electrode below the contact portion changes. Thus, the touch panel 130 can detect an operation (contact) of the display-surface cover member 2 with the display portion 2a. Then, the touch panel 130 can generate an electrical signal indicating the capacitance change between the X electrode and the Y electrode and output the electrical signal to the control unit 100. The control unit 100 can specify the details of an operation performed on the display portion 2a of the display-surface cover member 2 based on the electrical signal and perform an operation according to the specified details.

The proximity sensor 140 is, for example, an infrared type proximity sensor. The proximity sensor 140 can output a detection signal when an object approaches the proximity sensor 140 within a predetermined distance. The detection signal is input to the control unit 100. When the control unit 100 receives the detection signal from the proximity sensor 140, for example, the control unit 100 can stop a function of detecting an operation of the touch panel 130.

The front imaging unit 160 includes an imaging lens, an imaging element, and the like. The front imaging unit 160 can image a still image and a moving image based on the control by the control unit 100. The imaging lens of the front imaging unit 160 can be visually recognized from a front-surface-lens transparent part 11 (see, for example, FIGS. 1 and 2) on the front surface of the electronic apparatus 1. Therefore, the front imaging unit 160 can image an object in front of the surface side (cover member 2 side) of the electronic apparatus 1.

The rear imaging unit 170 includes an imaging lens, an imaging element, and the like. The rear imaging unit 170 can image a still image and a moving image based on the control by the control unit 100. The imaging lens of the rear imaging unit 170 can be recognized from a rear-surface-lens transparent part 13 (see FIG. 3) on the rear surface of the electronic apparatus 1. Therefore, the rear imaging unit 170 can image an object in front of the rear surface side of the electronic apparatus 1.

The microphone 150 can output a sound from the outside of the electronic apparatus 1 to the control unit 100 by converting the sound into an electric sound signal. The sound from the outside of the electronic apparatus 1 is received by the microphone 150 through microphone holes (not shown) configured in the electronic apparatus 1.

The external speaker 180 is, for example, a dynamic speaker. The external speaker 180 can convert the electric sound signal from the control unit 100 into a sound and then outputs the sound. The sound output from the external speaker 180 is output from speaker holes 12 provided on the rear surface of the electronic apparatus 1. The volume of the sound output from the speaker holes 12 can be set to a degree such that the sound can be heard at a location separated from the electronic apparatus 1.

The piezoelectric vibrating element 190 is attached to an inner surface 21 of the display-surface cover member 2 disposed on the front surface of the electronic apparatus 1, as described above (see, for example, FIG. 5). The piezoelectric vibrating element 190 can be vibrated by a drive voltage provided from the control unit 100. The control unit 100 can generate a drive voltage based on a sound signal, and provide the drive voltage to the piezoelectric vibrating element 190. The piezoelectric vibrating element 190 is vibrated by the control unit 100 based on a sound signal, vibrating the display-surface cover member 2 based on the sound signal. A reception sound is accordingly transmitted from the display-surface cover member 2 to the user. The volume of the reception sound can be set to a degree such that the user can hear the sound when moving the display-surface cover member 2 close to an ear. The reception sound transmitted from the display-surface cover member 2 to the user will be described below in detail.

The operation unit 200 includes a plurality of operation buttons 201 (see FIG. 1). For each of the plurality of operation buttons 201, when the user presses the operation button 201, the operation unit 200 can output, to the control unit 100, an operation signal indicating that the operation button 201 has been pressed. The control unit 100 can identify, based on an operation signal to be input, which operation button 201 of the plurality of operation buttons 201 has been operated, and then perform the operation according to the operation button 201 that has been operated.

The battery 210 can output the power for the electronic apparatus 1. The power output from the battery 210 is supplied to the respective electronic components such as the control unit 100 and the wireless communication unit 110 of the electronic apparatus 1.

<Mechanical Configuration of Electronic Apparatus>

As illustrated in, for example, FIG. 1, the electronic apparatus 1 has a plate shape and has an approximately rectangular shape, somewhat rounded in a plan view. The electronic apparatus 1 includes the transparent display-surface cover member 2 that covers a display surface 120a of the display panel 120 (see FIG. 5), a front case 3 that supports the display-surface cover member 2, and a rear case 4 mounted to the front case 3. The rear case 4 includes a case main body 40, which is mounted to the front case 3 and accommodates the battery 210, and a cover member 41 that is mounted to the case main body 40 from the rear surface side of the electronic apparatus 1. The battery 210 accommodated in the case main body 40 is covered with the cover member 41.

In one embodiment, the front case 3 and the rear case 4 form the apparatus case 5 that accommodates various components. A printed circuit board (not shown) in which various components such as the CPU 101 and the DSP 102 are mounted is provided in the space enclosed by the front case 3 and the rear case 4.

The electronic apparatus 1 further includes an upper cover member 6 that covers the upper end portion of the display-surface cover member 2 and a lower cover member 7 that covers the lower end portion of the display-surface cover member 2. The upper cover member 6 and the lower cover member 7 are mounted to the apparatus case 5, specifically, to the front case 3. The exterior of the electronic apparatus 1 is formed of the display-surface cover member 2, the upper cover member 6, the lower cover member 7, and the apparatus case 5.

The front case 3, the rear case 4, the upper cover member 6, and the lower cover member 7 are each made of, for example, resin. The resin forming the front case 3, the rear case 4, the upper cover member 6, and the lower cover member 7 may be, for example, a polycarbonate resin, an ABS resin, or a nylon-based resin.

The display-surface cover member 2 has a plate shape long in one direction. The display-surface cover member 2 includes an inner surface 20 opposed to the display surface 120a of the display panel 120, and an outer surface 21 opposite to the inner surface 20. The display-surface cover member 2 is made of sapphire. More specifically, the display-surface cover member 2 is a one-layer structured panel including a layer made of sapphire provided on the surface of the electronic apparatus 1.

Here, sapphire refers to an alumina ($Al_2O_3$) single crystal and, herein, refers to a single crystal having a purity of $Al_2O_3$ of approximately 90% or more. The purity of $Al_2O_3$ is preferably greater than or equal to 99% which provides a resistance to damage of the display-surface cover member and eliminates or reduces cracks or chipping.

In one embodiment, the display-surface cover member 2 is a panel of a one-layer structure having a layer made of sapphire which is disposed on the surface of the electronic apparatus 1. Alternatively, the display-surface cover member 2 may be a composite panel (laminated panel) of a multilayer structure having such a layer. For example, the display-surface cover member 2 may be a composite panel of a two-layered structure configured of a layer (sapphire panel) made of sapphire which is disposed on the surface of the electronic apparatus 1 and a layer (glass panel) made of glass which is attached to the layer. Alternatively, the display-surface cover member 2 may be a composite panel of a three-layered structure configured of a layer (sapphire panel) made of sapphire which is disposed on the surface of the electronic apparatus 1, a layer (glass panel) made of glass which is attached to the layer made of sapphire, and a layer (sapphire panel) made of sapphire which is attached to the layer made of glass. Further, the display-surface cover member 2 may include a layer made of crystalline materials other than sapphire such as diamond, zirconia, titania, crystal, lithium tantalite, and aluminum oxynitride.

The display-surface cover member 2 includes a transparent display portion (also referred to as a display window) 2a transmitting the display of the display panel 120. The display portion 2a has, for example, a rectangular shape in a plan view. The visible light output from the display panel 120 passes through the display portion 2a and is emitted to the outside of the electronic apparatus 1. The user visually recognizes information displayed on the display panel 120 through the display portion 2a from the outside of the electronic apparatus 1.

A portion of a peripheral end (peripheral portion) 2b that surrounds the display portion 2a is opaque and/or not transparent because of, for example, a film or the like that is attached thereto. Accordingly, the portion of the peripheral end 2b is a non-display portion that does not transmit the display of the display panel 120.

As illustrated in FIG. 5, the touch panel 130 is attached to the inner surface 20 of the display-surface cover member 2. The display panel 120 is attached to the surface opposite to surface on the inner surface 21 side of the touch panel 130. That is, the display panel 120 is installed on the inner surface 20 of the display-surface cover member 2 with the touch panel 130 therebetween. The display panel 120 is sandwiched between the display-surface cover member 2 and the front case 3. A portion of the display-surface cover member 2 facing the display panel 120 is the display portion 2a. The user can provide various instructions to the electronic apparatus 1 by operating the display portion 2a of the display-surface cover member 2 using the finger or the like.

In one embodiment, the display-surface cover member 2, which is made of sapphire, provides a resistance to damage to the display portion 2a of the display-surface cover member 2, that is, the portion of the display-surface cover member 2 that is operated by the user.

As illustrated in FIG. 5, the piezoelectric vibrating element 190 is attached to the inner surface 20 of the display-surface cover member 2 with an adhesive material 250. The adhesive material 250 may be a double-sided tape or an adhesive.

As illustrated in FIG. 3, the speaker holes 12 are provided on the rear surface of the electronic apparatus 1, specifically, the outside surface of the cover member 41 of the rear case 4. Provided on the rear surface of the electronic apparatus 1 is a rear-surface-lens transparent part 13, through which the imaging lens of the rear imaging unit 170 in the apparatus case 5 is visually recognized from the outside of the electronic apparatus 1.

Provided at an upper end of the display-surface cover member 2 is a proximity-sensor transparent part 10, through which the proximity sensor 140 in the apparatus case 5 is visually recognized from the outside of the electronic apparatus 1. In addition, a front-surface-lens transparent part 11 is provided at the upper end of the display-surface cover member 2, through which the imaging lens of the front imaging unit 160 in the apparatus case 5 is visually recognized from the outside of the electronic apparatus 1.

As illustrated in FIGS. 5 and 6, the display-surface cover member 2 is attached to the front case 3 through an adhesive material 260. In one embodiment, the entire periphery of the peripheral end of the inner surface 20 of the display-surface cover member 2 is attached to the front case 3 through the adhesive material 260. The adhesive material 260 may be a double-sided tape or an adhesive.

Each of the plurality of operation buttons 201 of the operation unit 200 provided inside the apparatus case 5 is a so-called hard key. As illustrated in FIG. 1, the surface of each operation button 201 is exposed from the lower cover member 7 that covers the lower end of the display-surface cover member 2. The operation button 201 is, for example, glass or resin. Other materials that may be used for the operation button 201 include crystalline materials such as sapphire, diamond, zirconia, titania, crystal, lithium tantalite, and aluminum oxynitride.

<Details of Shape of Display-Surface Cover Member>

As illustrated in, for example, FIGS. 1, 2, 5, 7, and 8, the display-surface cover member 2 has a shape obtained by removing two upper corners of a rectangular plate-shaped member. Each of the inner surface 20 and the outer surface 21 of the display-surface cover member 2 is hexagonal.

As illustrated in, for example, FIGS. 1, 2, and 8, the outline of the outer surface 21 includes a first partial outline 23, a second partial outline 24, a third partial outline 25, a fourth partial outline 26, a fifth partial outline 27, and a sixth partial outline 28. Each of the first partial outline 23, the second partial outline 24, the third partial outline 25, the fourth partial outline 26, the fifth partial outline 27, and the sixth partial outline 28 is a straight line.

The first partial outline 23 and the second partial outline 24 are parallel to each other and extend along a short-length direction DR2 (FIGS. 7 and 8) of the display-surface cover member 2. The third partial outline 25 and the fourth partial outline 26 are parallel to each other and extend along a longitudinal direction DR1 (see FIGS. 7 and 8) of the display-surface cover member 2. The first partial outline 23 and the second partial outline 24 are shorter than the third partial outline 25 and the fourth partial outline 26. Further, the first partial outline 23 is shorter than the second partial outline 24. The first partial outline 23 is located between a phantom line 25a, which extends outwardly along the longitudinal direction DR1 from one end of the third partial outline 25, and a phantom line 26a, which extends outwardly along the longitudinal direction DR1 from one end of the fourth partial outline 26. One end the other end of the second partial outline 24 are connected to the other ends of the third partial outline 25 and the fourth partial outline 26, respectively.

Each of the fifth partial outline 27 and the sixth partial outline 28 is inclined relative to both of the longitudinal direction DR1 and the short-length direction DR2. The fifth partial outline 27 extends obliquely downward from one end of the first partial outline 23 toward the outside to reach the one end of third partial outline 25. The sixth partial outline 28 extends obliquely downward from the other end of the first partial outline 23 toward the outside to reach the one end of the fourth partial outline 26.

Similarly, as illustrated in FIG. 7, the outline of the inner surface 20 includes a first partial outline 33, a second partial outline 34, a third partial outline 35, a fourth partial outline 36, a fifth partial outline 37, and a sixth partial outline 38. The first partial outline 33, the second partial outline 34, the third partial outline 35, the fourth partial outline 36, the fifth partial outline 37, and the sixth partial outline 38 of the inner surface 20 correspond to the first partial outline 23, the second partial outline 24, the third partial outline 25, the fourth partial outline 26, the fifth partial outline 27, and the sixth partial outline 28 of the outer surface 21, respectively.

While the two lower corners of the display-surface cover member 2 illustrated in, for example, FIGS. 7 and 8 form a right angle, they may be rounded. Alternatively, the two lower corners of the display-surface cover member 2 may be removed, similarly to the two upper corners.

Hereinafter, the longitudinal direction and the short-length direction refer to the longitudinal direction and the short-length direction, respectively, of the display-surface cover member 2 unless otherwise noted.

<Relationship Between Upper Cover Member and Display-Surface Cover Member>

As illustrated in FIG. 4, the upper cover member 6 has an approximately L-shape in a side view. As illustrated in, for example, FIGS. 4 to 6, the upper cover member 6 is located from the upper side surface of the electronic apparatus 1 to the upper end portion of the front surface of the electronic apparatus 1. As illustrated in FIG. 4, the upper cover member 6 is in contact with the upper side surface of the apparatus case 5, specifically, the upper side surface of the front case 3. The upper cover member 6 does not cover the side surfaces in the horizontal direction of the apparatus case 5 and the lower side surface of the apparatus case 5.

The upper cover member 6 is fixed to the front case 3 with two fixing members 220 and 221. Each of the fixing members 220 and 221 is, for example, a screw (screw nail). The fixing members 220 and 221 are mounted to the upper cover member 6 and the front case 3 (see FIG. 6), fixing the upper cover member 6 and the front case 3 to each other.

As illustrated in, for example, FIGS. 1 and 2, the upper cover member 6 covers the upper end portion of the outer surface 21 of the display-surface cover member 2. Specifically, the upper cover member 6 covers the first partial outline 23, the fifth partial outline 27, and the sixth partial outline 28 in the outline of the outer surface 21 of the display-surface cover member 2. The boundary line 60 of the upper cover member 6 with the outer surface 21 in a plan view seen from the outer surface 21 side curves toward the side opposite to the outer surface 21. More specifically, the boundary line 60 has an arch shape projecting toward the upper end of the electronic apparatus 1. Among the first partial outline 23, the second partial outline 24, the third partial outline 25, the fourth partial outline 26, the fifth partial outline 27, and the sixth partial outline 28 of the outer surface 21, the upper cover member 6 covers only the first partial outline 23, the fifth partial outline 27, and the sixth partial outline 28 and does not cover the second partial outline 24, the third partial outline 25, and the fourth partial outline 26.

While covering part of the outer surface 21 of the display-surface cover member 2, as illustrate in, for example, FIGS. 5 and 6, the upper cover member 6 is mounted to the front case 3 so as not to contact the display-surface cover member 2. Thus, the upper cover member 6 is not fixed to the display-surface cover member 2.

As illustrated in, for example, FIGS. 1 and 2, the upper cover member 6 does not cover the piezoelectric vibrating element 190 when the piezoelectric vibrating element 190 is seen through in a plan view from the outer surface 21 side of the display-surface cover member 2. In other words, the upper cover member 6 does not cover the portion of the display-surface cover member 2, on which the piezoelectric vibrating element 190 is provided (the portion of the display-surface cover member 2, which is opposed to the piezoelectric vibrating element 190). Thus, the vibration of the piezoelectric vibrating element 190 can be less likely to be interrupted by the display-surface cover member 2. Consequently, the reception sound can be easily transmitted to the user from the display-surface cover member 2.

As illustrated in FIGS. 1 and 2, in a plan view seen from the outer surface 21 side of the display-surface cover member 2, the fixing member 220 is located at the upper-left corner of the electronic apparatus 1. As illustrated in FIG. 2, in a plan view seen from the outer surface 21 side, the fixing member 220 is located in an area 230 enclosed by a phantom line 23a, which extends outwardly along the short-length direction from the one end of the first partial outline 23, the phantom line 25a, which extends outwardly along the longitudinal direction from the one end of the third partial outline 25, and the fifth partial outline 27. The fixing member 220 is mounted to the portion of the upper cover member 6, which is located on the front surface of the electronic apparatus 1. In a plan view seen from the outer surface 21 side, in the area 230, the fixing member 220 may be located so as to be visually recognized by the user or may be equipped with a lid or the like and located so as not to be visually recognized by the user.

As illustrated in FIGS. 1 and 2, in a plan view seen from the outer surface 21 side, the fixing member 221 is located at the upper-right corner of the electronic apparatus 1. As illustrated in FIG. 2, in a plan view seen from the outer surface 21 side, the fixing member 221 is located in an area 231 enclosed by a phantom line 23b, which extends outwardly along the short-length direction from the other end of the first partial outline 23, the phantom line 26a, which extends outwardly along the longitudinal direction from the one end of the fourth partial outline 26, and the sixth partial outline 28. The fixing member 221 is mounted to the portion of the upper cover member 6, which is located on the front surface of the electronic apparatus 1. In a plan view seen from the outer surface 21 side, in the area 231, the fixing member 221 may be located so as to be visually recognized by the user or may be equipped with a lid or the like and located so as not to be visually recognized by the user.

As described above, in one embodiment, the boundary line 60 of the upper cover member 6 with the outer surface 21 curves in a plan view seen from the outer surface 21 side. Thus, part of the outline of an exposed surface 21a on the outer surface 21 (the area visually recognized by the user on outer surface 21), specifically, an upper end 21aa of the exposed surface 21a curves. In addition, an upper end 61 of the upper cover member 6 curves outwardly in a plan view seen from the outer surface 21 side. In other words, the upper end of the electronic apparatus 1 curves outwardly in a plan view seen from the outer surface 21 side. In one embodiment, the upper end 21aa of the exposed surface 21a of the outer surface 21 and the upper end of the electronic apparatus 1 in a plan view seen from the outer surface 21 side are curved similarly in terms of designability.

<Relationship Between Lower Cover Member and Display-Surface Cover Member>

As illustrate in FIG. 4, the lower cover member 7 has an approximately L-shape in a side view. As illustrated in FIGS. 4 and 5, the lower cover member 7 is located from the lower side surface of the electronic apparatus 1 to the lower end portion of the front surface of the electronic apparatus 1. As illustrated in FIG. 4, the lower cover member 7 is in contact with the lower side surface of the apparatus case 5, specifically, the lower side surface of the front case 3. The lower cover member 7 does not cover the side surfaces in the horizontal direction of the apparatus case 5 and the lower surface of the apparatus case 5.

The lower cover member 7 is fixed to the front case 3 with two fixing members 222 and 223. Each of the fixing members 222 and 223 is, for example, a screw (screw nail). The fixing members 222 and 223 are mounted to the lower cover member 7 and the front case 3, fixing the lower cover member 7 and the front case 3 to each other.

As illustrated in, for example, FIG. 1, the lower cover member 7 covers the lower end portion of the outer surface 21 of the display-surface cover member 2. Specifically, the lower cover member 7 covers the entire second partial outline 24 on the outer surface 21 of the display-surface cover member 2, and the lower end portions of the third partial outline 25 and the fourth partial outline 26 on the outer surface 21. The boundary line 70 of the lower cover member 7 with the outer surface 21 in a plan view seen from the outer surface 21 side is a straight line extending along the short-length direction.

A lower end 71 of the lower cover member 7 curves outwardly in a plan view seen from the outer surface 21 side. In other words, the lower end of the electronic apparatus 1 curves outwardly in a plan view seen from the outer surface 21 side. In one embodiment, the lower end of the electronic apparatus 1 in a plan view seen from the outer surface 21 side is curved in terms of designability.

While covering part of the outer surface 21 of the display-surface cover member 2, as illustrated in FIGS. 4 and 5, the lower cover member 7 is mounted to the front case 3 so as not to contact the display-surface cover member 2. Thus, the lower cover member 7 is not fixed to the display-surface cover member 2.

As illustrated in FIG. 1, in a plan view seen from the outer surface 21 side, the fixing member 222 is located at the lower-left corner of the electronic apparatus 1. In a plan view seen from the outer surface 21 side, the fixing member 222 is located below the second partial outline 24. The fixing member 222 is mounted to the portion of the lower cover member 7, which is located on the front surface of the electronic apparatus 1. In a plan view seen from the outer surface 21 side, at the lower-left corner of the electronic apparatus 1, the fixing member 222 may be located as to be visually recognized by the user or may be equipped with a lid or the like and located so as not to be visually recognized by the user.

As illustrated in FIG. 1, in a plan view seen from the outer surface 21 side, the fixing member 223 is located at the lower-right corner of the electronic apparatus 1. In a plan view seen from the outer surface 21 side, the fixing member 223 is located below the second partial outline 24. The fixing member 223 is mounted to the portion of the lower cover member 7, which is located on the front surface of the electronic apparatus 1. In a plan view seen from the outer surface 21 side, at the lower-right corner of the electronic apparatus 1, the fixing member 223 may be located so as to be visually recognized by the user or may be equipped with a lid or the like and located so as not to be visually recognized by the user.

As described above, in one embodiment, the boundary line 60 of the upper cover member 6 with the outer surface 21 in a plan view seen from the outer surface 21 side is curved, curving part of the outline of the exposed surface 21a of the outer surface 21, specifically, the upper end 21aa of the exposed surface 21a.

The upper end of the exposed surface of the outer surface 21 can be curved by providing no upper cover member 6 and processing the display-surface cover member 2 to curve the upper end of the outer surface 21 such that the entire outer surface 21 of the display-surface cover member 2 is exposed.

Unfortunately, it is difficult to process the display-surface cover member 2 to curve the upper end of the outer surface 21 because the display-surface cover member 2 including a layer made of sapphire is harder than a display-surface cover member made of glass or the like.

In one embodiment, the boundary line 60 of the upper cover member 6 with the outer surface 21 in a plan view seen from the outer surface 21 side is curved, thereby curving the upper end 21aa of the exposed surface 21a of the outer surface 21. Thus, the upper end 21aa of the exposed surface 21a of the outer surface 21 can be curved easily without processing the display-surface cover member 2 to curve the upper end of the outer surface 21.

The upper end portion of the outer surface 21 of the display-surface cover member 2 is covered with the upper cover member 6, allowing the upper cover member 6 to protect the display-surface cover member 2. Thus, the display-surface cover member 2 can be less likely to be damaged or broken when, for example, the electronic apparatus 1 is dropped.

The lower end portion of the outer surface 21 of the display-surface cover member 2 is covered with the lower cover member 7, allowing the lower cover member 7 to protect the display-surface cover member 2. Thus, the display-surface cover member 2 can be less likely to be damaged or broken.

In one embodiment, in a plan view seen from the outer surface 21 side, the fixing member 220 is located in the area 230 enclosed by the phantom line 23a, which extends along the short-length direction from the one end of the first partial outline 23, the phantom line 25a, which extends along longitudinal direction from the one end of the third partial outline 25, and the fifth partial outline 27 (see FIG. 2). In other words, the fixing member 220 is disposed with the use of an empty space obtained by removing one of the corners in the short-length direction of the display-surface cover member 2.

In a plan view seen from the outer surface 21 side, the fixing member 221 is located in the area 231 enclosed by the phantom line 23b, which extends along the short-length direction from the other end of the first partial outline 23, the phantom line 26a, which extends along the longitudinal direction from the one end of the fourth partial outline 26, and the sixth partial outline 28 (see FIG. 2). In other words, the fixing member 221 is located with the use of an empty space obtained by removing the other corner of the display-surface cover member 2 in the short-length direction.

Considered here is a case in which the outer surface 21 has no fifth partial outline 27 and no sixth partial outline 28 because the both corners in the horizontal direction of the display-surface cover member 2 are not removed, with the one end and the other end of the first partial outline 23 being connected to the one ends of the third partial outline 25 and the fourth partial outline 26, respectively. In this case, in a plan view seen from the outer surface 21 side, the fixing members 220 and 221 need to be disposed above the first partial outline 23. This unfortunately increases the length in the longitudinal direction of the electronic apparatus 1.

In one embodiment, in a plan view seen from the outer surface 21 side, the fixing member 220 is located in the area 230 enclosed by the phantom line 23a, which extends from the one end of the first partial outline 23, the phantom line 25a, which extends from the one end of the third partial outline 25, and the fifth partial outline 27. Thus, the fixing member 220 is located below the first partial outline 23 in a plan view seen from the outer surface 21 side. Similarly, in a plan view seen from the outer surface 21 side, the fixing member 221 is located below the first partial outline 23. Thus, the length in the longitudinal direction of the electronic apparatus 1 can be less likely to increase due to the presence of the fixing members 220 and 221.

The fixing members 220 to 223 may be members other than screws. For example, the fixing members 220 and 221 may be a double-sided tape or an adhesive that bonds the upper cover member 6 and the front case 3. Likewise, the fixing members 222 and 223 may be a double-sided tape or an adhesive that bonds the lower cover member 7 and the front case 3.

If the apparatus case 5 is provided with a cover member that covers the whole outline of the outer surface 21 of the display-surface cover member 2 (the first partial outline 24, the second partial outline 24, the third partial outline 25, the fourth partial outline 26, the fifth partial outline 27, and the sixth partial outline 28), a fingernail or the like of the user easily slides into the space between the cover member and the display-surface cover member 2, which may cause the cover member to be peel off.

In one embodiment, a fingernail or the like of the user is less likely to slide into the space between the display-surface cover member 2 and the upper cover member 6 and between the display-surface cover member 2 and the lower cover member 7 because most of the both sides in the short-length direction of the display-surface cover member 2 on the outer surface 21 (third partial outline 25 and fourth partial outline 26) are not covered with the upper cover member 6 and the lower cover member 7. Thus, the upper cover member 6 and the lower cover member 7 can be less likely to peel off.

<Details of Piezoelectric Vibrating Element>

Figure 10:
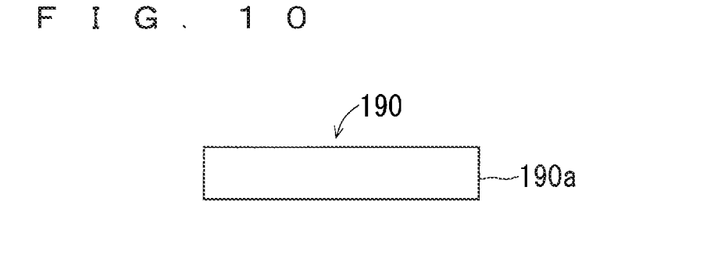
FIG. 10 illustrates a top view showing a structure of a piezoelectric vibrating element.
Figure 11:
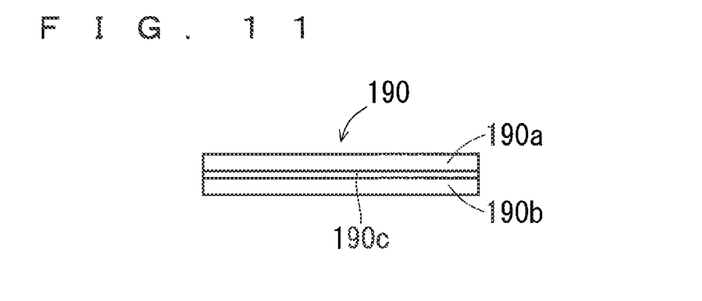
FIG. 11 illustrates a side view showing the structure of the piezoelectric vibrating element.

FIGS. 10 and 11 are a top view and a side view, respectively, illustrating a structure of the piezoelectric vibrating element 190. As illustrated in FIGS. 10 and 11, the piezoelectric vibrating element 190 has a long shape in one direction. Specifically, the piezoelectric vibrating element 190 has a long and narrow rectangular plate shape in a plan view. The piezoelectric vibrating element 190 has, for example, a bimorph structure. The piezoelectric vibrating element 190 includes a first piezoelectric ceramic plate 190a and a second piezoelectric ceramic plate 190b which are bonded to each other through a shim material 190c.

In the piezoelectric vibrating element 190, when a positive voltage is applied to the first piezoelectric ceramic plate 190a and a negative voltage is applied to the second piezoelectric ceramic plate 190b, the first piezoelectric ceramic plate 190a extends along the longitudinal direction and the second piezoelectric ceramic plate 190b contracts along the longitudinal direction. Accordingly, as illustrated in FIG. 12, the piezoelectric vibrating element 190 is bent into a convex shape with the first piezoelectric ceramic plate 19a being outside.

In contrast, in the piezoelectric vibrating element 190, when a negative voltage is applied to the first piezoelectric ceramic plate 190*a* and a positive voltage is applied to the second piezoelectric ceramic plate 190*b*, the first piezoelectric ceramic plate 190*a* contracts along the longitudinal direction and the second piezoelectric ceramic plate 190*b* extends along the longitudinal direction. Accordingly, as illustrated in FIG. 13, the piezoelectric vibrating element 190 is bent into a convex shape with the second piezoelectric ceramic plate 190*b* being outside.

Figure 12:
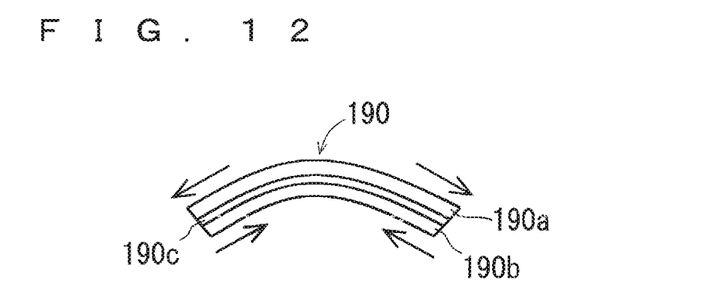
FIG. 12 illustrates how the piezoelectric vibrating element vibrates while being bent.
Figure 13:
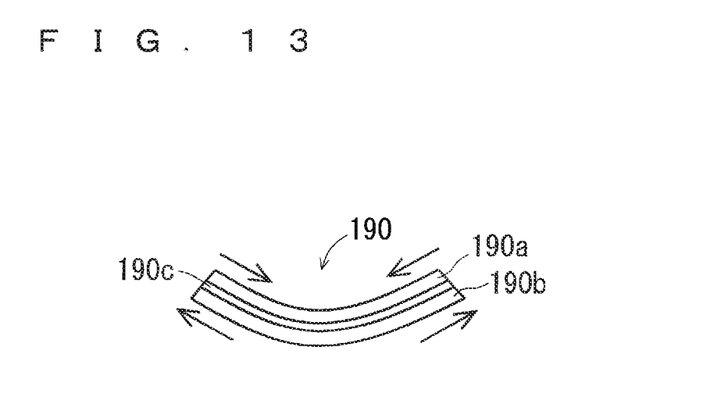
FIG. 13 illustrates how the piezoelectric vibrating element vibrates while being bent.

The piezoelectric vibrating element 190 vibrates while being bent along the longitudinal direction by alternately taking the state of FIG. 12 and the state of FIG. 13. The control unit 100 allows the piezoelectric vibrating element 190 to vibrate while being bent along the longitudinal direction by applying an alternating current (AC) voltage in which the positive voltage and the negative voltage alternately appear at an area between the first piezoelectric ceramic plate 190*a* and the second piezoelectric ceramic plate 190*b*.

Only one structure made of the first piezoelectric ceramic plate 190*a* and the second piezoelectric ceramic plate 190*b*, which are bonded to each other with the shim material 190*c* therebetween, is provided in the piezoelectric vibrating element 190 illustrated in FIGS. 10 to 13. Alternatively, a plurality of the structures may be laminated to each other.

The piezoelectric vibrating element 190 having such a structure is disposed on the peripheral end of the inner surface 20 of the display-surface cover member 2, as illustrated in FIG. 7. Specifically, the piezoelectric vibrating element 190 is disposed in a central portion in the short-length direction DR2 in the upper end of the inner surface 20 of the display-surface cover member 2. The piezoelectric vibrating element 190 is disposed such that the longitudinal direction thereof extends along the short-length direction DR2 of the display-surface cover member 2. In this manner, the piezoelectric vibrating element 190 vibrates while being bent along the short-length direction of the display-surface cover member 2. Further, the center of the piezoelectric vibrating element 190 in the longitudinal direction corresponds to the center of the display-surface cover member 2 in the short-length direction DR2 in the upper end of the inner surface 20.

As illustrated in FIGS. 12 and 13, the center of the piezoelectric vibrating element 190 in the longitudinal direction has the largest displacement amount when the piezoelectric vibrating element 190 is vibrating. Accordingly, an area in the center in the short-length direction DR2 in the upper end of the inner surface 20 of the display-surface cover member 2, which corresponds to the position of the piezoelectric vibrating element 190, has the largest displacement amount of bending and vibrating.

Considered here is a phantom line 39 being a straight line passing through one end of the fifth partial outline 37 of the inner surface 20, which is connected with the third partial outline 35, and one end of the sixth partial outline 38 of the inner surface 20, which is connected with the fourth partial outline 36. In one embodiment, at least part of the piezoelectric vibrating element 190 is disposed in an area 240 enclosed by the phantom line 39, the fifth partial outline 37, the sixth partial outline 38, and the first partial outline 33. The whole of the piezoelectric vibrating element 190 may be disposed in the area 240.

<Generation of Reception Sound>

In the electronic apparatus 1 according to one embodiment, the piezoelectric vibrating element 190 causes the display-surface cover member 2 to vibrate, so that the air conduction sound and the conducted sound are transmitted from the display-surface cover member 2 to the user. In other words, a vibration of the piezoelectric vibrating element 190 itself is transmitted to the display-surface cover member 2, so that the air conduction sound and the conducted sound are transmitted from the display-surface cover member 2 to the user.

Here, the term "air conduction sound" means a sound recognized in the human brain by the vibration of an eardrum due to a sound wave (air vibration) which enters an external auditory meatus hole (a so-called "ear hole"). On the other hand, the term "conducted sound" is a sound recognized in the human brain by the vibration of the eardrum due to the vibration of an auricle transmitted to the eardrum. Hereinafter, the air conduction sound and the conducted sound will be described in detail.

Figure 14:
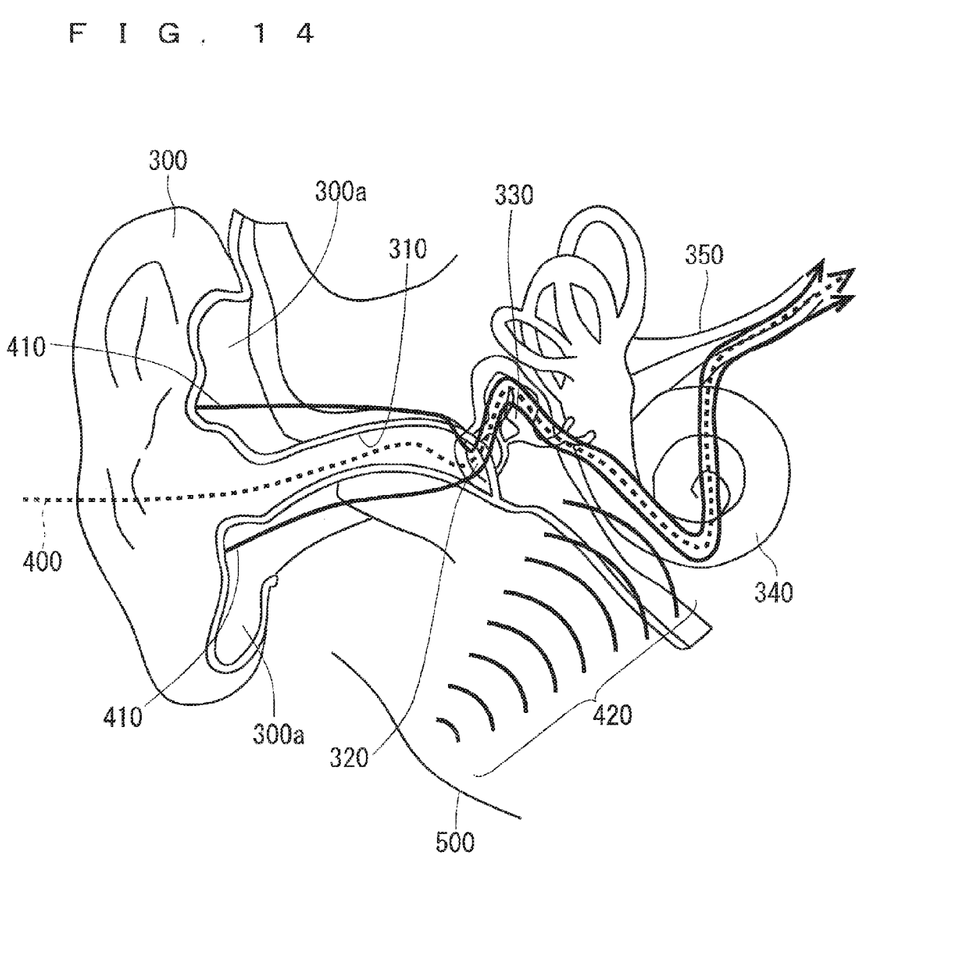
FIG. 14 illustrates a view for describing air conduction sound and conducted sound.

FIG. 14 is a view for describing the air conduction sound and the conducted sound. FIG. 14 illustrates the structure of the ear of the user of the electronic apparatus 1. In FIG. 14, a dotted line 400 indicates a conduction path of a sound signal (sound information) of the air conduction sound. A solid line 410 indicates the conduction path of the sound signal of the conducted sound.

When the piezoelectric vibrating element 190 mounted on the display-surface cover member 2 vibrates based on the electric sound signal indicating the reception sound, the display-surface cover member 2 vibrates, and a sound wave is output from the display-surface cover member 2. When the user moves the display-surface cover member 2 of the electronic apparatus 1 close to an auricle 300 of the user by holding the electronic apparatus 1 in a hand, or the display-surface cover member 2 of the electronic apparatus 1 is set to (brought into contact with) the auricle 300 of the user, the sound wave output from the display-surface cover member 2 enters an external auditory meatus hole 310. The sound wave from the display-surface cover member 2 travels through the external auditory meatus hole 310 and causes the eardrum 320 to vibrate. The vibration of the eardrum 320 is transmitted to an auditory ossicle 330 and the auditory ossicle 330 vibrates. In addition, the vibration of the auditory ossicle 330 is transmitted to a cochlea 340 and is converted into an electrical signal in the cochlea 340. The electrical signal is transmitted to the brain by passing through an acoustic nerve 350 and the reception sound is recognized in the brain. In this manner, the air conduction sound is transmitted from the display-surface cover member 2 to the user.

Further, when the user puts the display-surface cover member 2 of the electronic apparatus 1 to the auricle 300 of the user by holding the electronic apparatus 1 in a hand, the auricle 300 is vibrated by the display-surface cover member 2, which is vibrated by the piezoelectric vibrating element 190. The vibration of the auricle 300 is transmitted to the eardrum 320, and thus the eardrum 320 vibrates. The vibration of the eardrum 320 is transmitted to the auditory ossicle 330, and thus the auditory ossicle 330 vibrates. The vibration of the auditory ossicle 330 is transmitted to the cochlea 340 and is converted into an electrical signal in the cochlea 340. The electrical signal is transmitted to the brain by passing through the acoustic nerve 350 and the reception sound is recognized in the brain. In this manner, the conducted sound is transmitted from the display-surface cover member 2 to the user. FIG. 14 illustrates an auricle cartilage 300*a* in the inside of the auricle 300.

Bone conduction sound is a sound recognized in the human brain by the vibration of the skull and direct stimulation of the inner ear such as the cochlea caused by the vibration of the skull. In FIG. 14, in a case where a jawbone 500 is vibrated, the transmission path of the sound signal while the bone conduction sound is recognized in the brain is indicated with a plurality of arcs 420.

As described above, the air conduction sound and the conducted sound can be transmitted from the display-surface cover member 2 to the user of the electronic apparatus 1 due to an appropriate vibration of the display-surface cover member 2 through the vibration of the piezoelectric vibrating element 190. The user can hear the air conduction sound from the display-surface cover member 2 by moving the display-surface cover member 2 close to an ear (auricle). Further, the user can hear the air conduction sound and the conducted sound from the display-surface cover member 2 by bringing the display-surface cover member 2 into contact with an ear (auricle). The structure of the piezoelectric vibrating element 190 according to one embodiment is contrived to appropriately transmit the air conduction sound and the conducted sound to the user. Various advantages are achieved by configuring the electronic apparatus 1 to transmit the air conduction sound and the conducted sound to the user.

Since the user can hear a sound when putting the display-surface cover member 2 to the ear, communication using the electronic apparatus 1 can be performed without much concerning of the position of the electronic apparatus 1 with respect to the ear.

In addition, if there is a large amount of ambient noise, the user can make it difficult to hear the ambient noise by strongly putting the display-surface cover member 2 to the ear while turning up the volume of the conducted sound. Accordingly, the user can appropriately perform communication even when there is a large amount of the ambient noise.

In addition, even with earplugs or earphones on his/her ears, the user can recognize the reception sound from the electronic apparatus 1 by putting the display-surface cover member 2 to the ear (more specifically, the auricle). Further, even with headphones on his/her ears, the user can recognize the reception sound from the electronic apparatus 1 by putting the display-surface cover member 2 to the headphones.

The portion of the display-surface cover member 2, on which the piezoelectric vibrating element 190 is mounted, is vibrated relatively easily. Thus, the user can easily hear the sound from the display-surface cover member 2 by moving an upper end (particularly, a central portion in the short-length direction DR2 of the upper end) of the display-surface cover member 2, on which the piezoelectric vibrating element 190 is mounted, close to the ear or putting the portion to the ear.

In one embodiment, the upper cover member 6 that covers the upper end of the outer surface 21 of the display-surface cover member 2 is not fixed to the display-surface cover member 2, as described above. This reduces the occurrence of the display-surface cover member 2 being resistant to vibrating due to the upper cover member 6. Therefore, this reduces the occurrence in which the sound from the display-surface cover member 2 is difficult to be transmitted to the user by the lower cover member.

In one embodiment, the lower cover member 7 that covers the lower end portion of the outer surface 21 of the display-surface cover member 2 is not fixed to the display-surface cover member 2. This reduces the occurrence of the display-surface cover member 2 being resistant to vibrating due to the lower cover member 7. Therefore, this reduces the occurrence in which the sound from the display-surface cover member 2 is difficult to be transmitted to the user by the lower cover member 7.

While the fifth partial outlines 27 and 37 and the sixth partial outlines 28 and 38 have a linear shape in one example above, they may have other shape. For example, the fifth partial outlines 27 and 37 and the sixth partial outlines 28 and 38 may be a curved shape or a waveform shape.

In the above description, although embodiments of the present disclosure are applied to mobile phones, embodiments of the present disclosure are also applicable to other electronic apparatuses in addition to the mobile phones such as smartphones, for example, tablet terminals.

In the above description, the electronic apparatus 1 is described in detail, but the above description is the exemplification in all aspects and embodiments of the present disclosure are not intended to be limited thereto. In addition, various examples described above are applicable in combination as long as they are not mutually inconsistent. And, it is construed that numerous modifications which are not exemplified can be envisaged without departing from the scope of the present disclosure.

The invention claimed is:

1. An electronic apparatus comprising:
    an internal display unit;
    a first cover member that is made of sapphire and has an interior first surface facing a display surface of said internal display unit and an exterior second surface opposite to said interior first surface and forming a part of an exterior of the electronic apparatus, said exterior second surface having an outline of polygonal shape;
    an apparatus case to which said first cover member is mounted, said apparatus case accommodating said internal display unit;
    a second cover member that covers a part of said exterior second surface of said first cover member; and
    a fixing member that fixes said second cover member and said apparatus case to each other, said fixing member fixing said second cover member and said apparatus case to each other without said first cover member interposed therebetween,
    wherein said exterior second surface of said first cover member comprises an outline including
        a first partial outline that extends along a first direction,
        a second partial outline that extends along a second direction that is different from said first direction, and
        a third partial outline that extends along a third direction that is different from said first direction and said second direction, and connects one end of said first partial outline and one end of said second partial outline,
    wherein said second cover member covers said first partial outline and said third partial outline, and
    wherein, in a plan view seen from said exterior second surface side, said fixing member is located in an area enclosed by a first phantom line that extends along said first direction from said one end of said first partial outline, a second phantom line that extends along said second direction from said one end of said second partial outline, and said third partial outline.

2. The electronic apparatus according to claim 1, wherein said second cover member is not fixed to said first cover member by said fixing member.

3. The electronic apparatus according to claim 1, wherein said second cover member covers multiple sides of said exterior second surface.

4. The electronic apparatus according to claim 1, wherein said fixing member is a screw.

5. The electronic apparatus according to claim 1, wherein said second cover member is provided with a plurality of operation buttons side by side thereon.

6. The electronic apparatus according to claim 1, wherein said fixing member is located in the same straight line as said plurality of operation buttons.

\* \* \* \* \*